United States Patent
Mishima et al.

(10) Patent No.: US 7,602,458 B2
(45) Date of Patent: Oct. 13, 2009

(54) LIQUID CRYSTAL DISPLAY MODULE AND LIQUID CRYSTAL DISPLAY DEVICE

(75) Inventors: Yasuyuki Mishima, Mobara (JP); Hidenao Kubota, Mobara (JP)

(73) Assignee: Hitachi Displays, Ltd., Chiba (JP)

( * ) Notice: Subject to any disclaimer, the term of this patent is extended or adjusted under 35 U.S.C. 154(b) by 310 days.

(21) Appl. No.: 11/758,103

(22) Filed: Jun. 5, 2007

(65) Prior Publication Data
US 2008/0007668 A1    Jan. 10, 2008

(30) Foreign Application Priority Data
Jun. 9, 2006    (JP) .............................. 2006-160429

(51) Int. Cl.
G02F 1/1333    (2006.01)
G02F 1/1335    (2006.01)

(52) U.S. Cl. .......................................... 349/58; 349/67

(58) Field of Classification Search .................... 349/67
See application file for complete search history.

(56) References Cited
U.S. PATENT DOCUMENTS 6,330,045 B1 * 12/2001 Tanaka ......................... 349/58
7,083,318 B2 * 8/2006 Ha et al. ....................... 362/633
2001/0024248 A1 * 9/2001 Kim ............................. 349/58
2004/0125269 A1 * 7/2004 Kim et al. ..................... 349/58
2006/0092345 A1 * 5/2006 Takeuchi ...................... 349/60

FOREIGN PATENT DOCUMENTS

JP           11-305228           11/1999

* cited by examiner

Primary Examiner—Michelle R Connelly Cushwa
(74) Attorney, Agent, or Firm—Antonelli, Terry, Stout & Kraus, LLP.

(57) ABSTRACT

The present invention provides a liquid crystal display module or a liquid crystal display device which can prevent the generation of display irregularities. In the liquid crystal display module which includes a liquid crystal display panel, a frame-like mold frame, a light guide plate, and a reflection sheet, the liquid crystal display panel is arranged on an upper side of the mold frame, the light guide plate and the reflection sheet are arranged on a lower side of the mold frame, the reflection sheet is adhered to the mold frame using an adhesive agent which is formed on at least two sides of the reflection sheet which face each other in an opposed manner, and a portion of one side of the reflection sheet on which the adhesive agent is arranged has a length larger than a length of a portion of another side of the reflection sheet on which the adhesive agent is arranged.

15 Claims, 11 Drawing Sheets

LIQUID CRYSTAL DISPLAY MODULE AND LIQUID CRYSTAL DISPLAY DEVICE

CROSS-REFERENCE TO RELATED APPLICATIONS

The disclosure of Japanese Patent Application No. 2006-160429 filed on Jun. 9, 2006 including the specification, drawings and abstract is incorporated herein by reference in its entirety.

BACKGROUND

1. Field of the Invention

The present invention relates to a liquid crystal display module and a liquid crystal display device, and more particularly to a small-sized liquid crystal display module such as a mobile phone.

2. Description of Related Arts

Currently, a small-sized liquid crystal display panel having a size of approximately 2 to 4 inches has been used in a mobile phone. The mobile phone includes a liquid crystal display module which is constituted of a liquid crystal display panel and a backlight device arranged on a back surface of the liquid crystal display panel and a housing which houses the liquid crystal display module. Recently, the mobile phone is requested to satisfy two demands, that is, a demand for miniaturizing the mobile phone per se and a demand for making a display screen as large as possible.

Accordingly, currently, an attempt has been made to satisfy these two demands by housing a liquid crystal display module having a display screen as large as possible in a housing having a housing space as small as possible by pushing.

Here, although not directly related to the present invention, a technique which fixes a reflection sheet using a pressure sensitive adhesive double coated tape is described in Japanese Patent Laid-Open Hei 11-305228 (patent document 1).

SUMMARY

With respect to a liquid crystal display module of a liquid crystal mobile phone which constitutes a display panel, a reflection sheet is arranged below a backlight device. In such a constitution, it is found that, due to the temperature elevation attributed to heat from the backlight device, the reflection sheet is deflected by expansion (the temperature in a set being elevated when a housing becomes small with fixed power consumption) or a reflection sheet is deflected attributed to shortage of clearance between the liquid crystal display module and the housing thus giving rise to display irregularities.

Accordingly, the present invention has been made to overcome such drawbacks and it is an object of the present invention to provide a liquid crystal display module or a liquid crystal display device which can prevent the generation of display irregularities even when the liquid crystal display module having a display screen as large as possible is housed in a housing having a housing space as small as possible by pushing.

According to one aspect of the present invention, there is provided a liquid crystal display module which includes a liquid crystal display panel, a frame-like mold frame, a light guide plate and a reflection sheet, wherein the liquid crystal display panel is arranged on an upper side of the mold frame, the light guide plate and the reflection sheet are arranged on a lower side of the mold frame, the reflection sheet is adhered to the mold frame using an adhesive agent which is formed on at least two sides of the reflection sheet which face each other in an opposed manner, and a portion of one side of the reflection sheet on which the adhesive agent is arranged has a length larger than a length of a portion of another side of the reflection sheet on which the adhesive agent is arranged.

To be more specific, the portion of one side of the reflection sheet on which the adhesive agent is arranged has a length two or more times as large as a length of the portion of another side of the reflection sheet on which the adhesive agent is arranged.

In such a constitution, the portion of another side of the reflection sheet on which the adhesive agent is arranged may be necessary to have a length of 5 mm or more (at least 2 mm or more) to prevent the peeling-off of the reflection sheet.

Further, the portion of another side of the reflection sheet on which the adhesive agent is arranged may be formed from an end portion of the reflection sheet.

Further, the portion of one side of the reflection sheet on which the adhesive agent is arranged may be arranged over the whole one side.

In such a constitution, the reflection sheet may be configured such that a portion of the reflection sheet other than the portion of another side of the reflection sheet on which the adhesive agent is arranged in a short length is cut out.

In such a constitution, to prevent dusts from intruding into the liquid crystal display module from the portion where the adhesive agent is not formed, the adhesive agent may be arranged on a portion of the flexible printed circuit board which is arranged to cover the reflection sheet which is brought into contact with the reflection sheet. Due to such a constitution, it is possible to prevent the intrusion of dusts.

Further, besides such a means, it may be possible to provide a means which forms a hook on a portion of the mold frame corresponding to the portion of the reflection sheet on which the adhesive agent is not formed thus preventing floating of the reflection sheet.

For example, by forming a cutout in a portion of the reflection sheet on which the adhesive agent is not formed, it is possible to prevent the portion of the reflection sheet from being brought into contact with the mold frame. Accordingly, the formation of the cutout is an effective means for releasing the expansion of the reflection sheet attributed to heat or a force applied to the reflection sheet.

According to another aspect of the present invention, there is provided a liquid crystal display device which includes a liquid crystal display module including a liquid crystal display panel, a frame-like mold frame, a light guide plate and a reflection sheet, and a housing which houses the liquid crystal display module, wherein the liquid crystal display module is configured such that the liquid crystal display panel is arranged on an upper side of the mold frame, the light guide plate and the reflection sheet are arranged on a lower side of the mold frame, the reflection sheet is adhered to the mold frame using an adhesive agent which is formed on at least two sides of the reflection sheet which face each other in an opposed manner, and a portion of one side of the reflection sheet on which the adhesive agent is arranged has a length larger than a length of a portion of another side of the reflection sheet on which the adhesive agent is arranged.

According to still another aspect of the present invention, there is provided a liquid crystal display module which includes a liquid crystal display panel, a frame-like mold frame, a light guide plate and a reflection sheet, wherein the liquid crystal display panel is arranged on an upper side of the mold frame, the light guide plate and the reflection sheet are arranged on a lower side of the mold frame, the reflection sheet is adhered to the mold frame using an adhesive agent which is formed on at least two sides of the reflection sheet which face each other in an opposed manner, a portion of one side of the reflection sheet on which the adhesive agent is arranged has a length larger than a length of a portion of another side of the reflection sheet on which the adhesive agent is arranged, and a hook which prevents floating of the reflection sheet is formed on a portion of the mold frame at a portion of the reflection sheet other than the portion of another side of the reflection sheet on which the adhesive agent is arranged.

According to still another aspect of the present invention, there is provided a liquid crystal display device which includes a liquid crystal display module including a liquid crystal display panel, a frame-like mold frame, a light guide plate and a reflection sheet, and a housing which houses the liquid crystal display module, wherein the liquid crystal display module is configured such that the liquid crystal display panel is arranged on an upper side of the mold frame, the light guide plate and the reflection sheet are arranged on a lower side of the mold frame, the reflection sheet is adhered to the mold frame using an adhesive agent which is formed on at least two sides of the reflection sheet which face each other in an opposed manner, a portion of one side of the reflection sheet on which the adhesive agent is arranged has a length larger than a length of a portion of another side of the reflection sheet on which the adhesive agent is arranged, and a hook which prevents floating of the reflection sheet is formed on a portion of the mold frame at a portion of the reflection sheet other than the portion of another side of the reflection sheet on which the adhesive agent is arranged.

It is an object of the present invention to provide a liquid crystal display device which can prevent the generation of display irregularities.

BRIEF DESCRIPTION OF THE DRAWINGS

FIG. 2A and FIG. 2B are views showing the constitution of the liquid crystal module 10, wherein FIG. 2A is a view of a mold casing 11 shown in FIG. 1 as viewed from a side on which a light guide plate 15 is arranged, and FIG. 2B shows the cross-sectional constitution of the liquid crystal display module taken along a line A-A' in FIG. 2A;

DETAILED DESCRIPTION OF THE INVENTION

Figure 1:
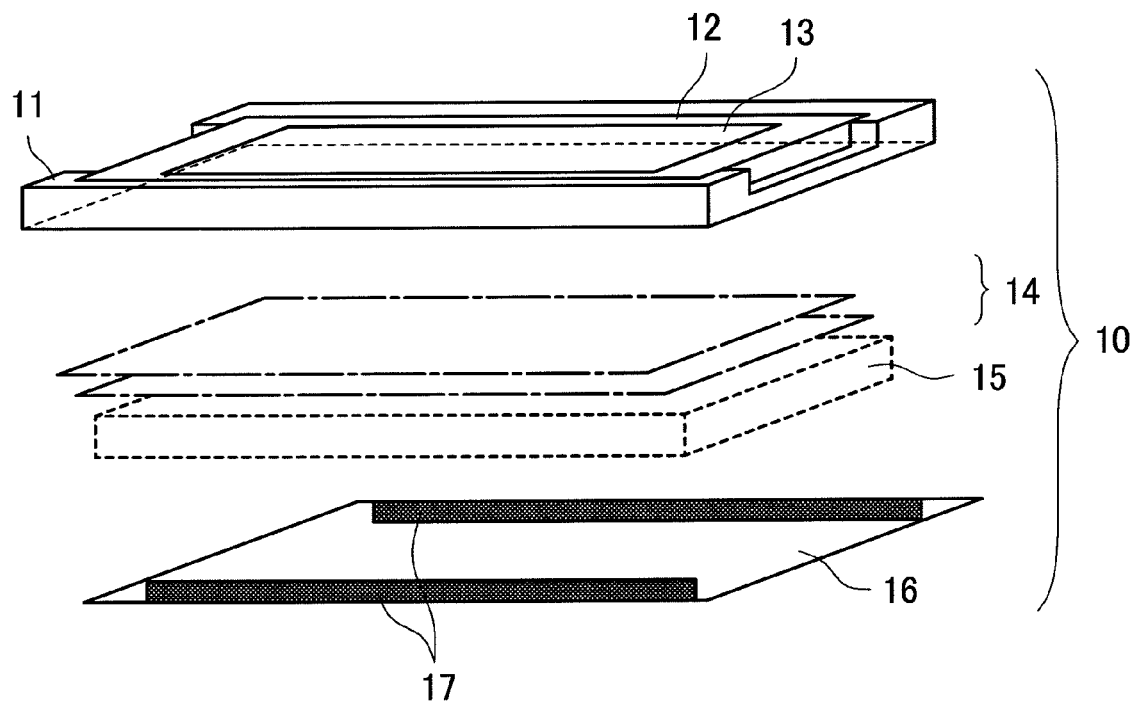
FIG. 1 is a view showing the constitution of a liquid crystal display module related to the present invention and the conventional constitution.

FIG. 1 shows the constitution of a liquid crystal display module 10 related to the present invention and the conventional constitution.

The liquid crystal display module 10 is, for example, configured such that a liquid crystal panel 12 is formed by sandwiching liquid crystal between two transparent substrates such as glass plates having different sizes, and the liquid crystal panel 12 is housed in a frame-like mold casing 11 made of a resin, for example. Here, images are displayed on a display region 13 of the liquid crystal panel 12.

Optical sheets 14 such as a diffusion sheet and a prism sheet are arranged below the frame-like mold casing 11, and a light guide plate 15 is arranged below the optical sheet 14. Here, although not shown in FIG. 1, a light source such as an LED is arranged on at least one side surface of the light guide plate 15. The light guide plate 15 is housed in the mold casing 11 of the liquid crystal display module 10 on a side opposite to a side where the liquid crystal panel 12 is housed, and a reflection sheet 16 which is arranged below the light guide plate 15 is adhered to the mold casing 11 using an adhesive agent 17 formed on a periphery of the reflection sheet 16.

Figure 2A:
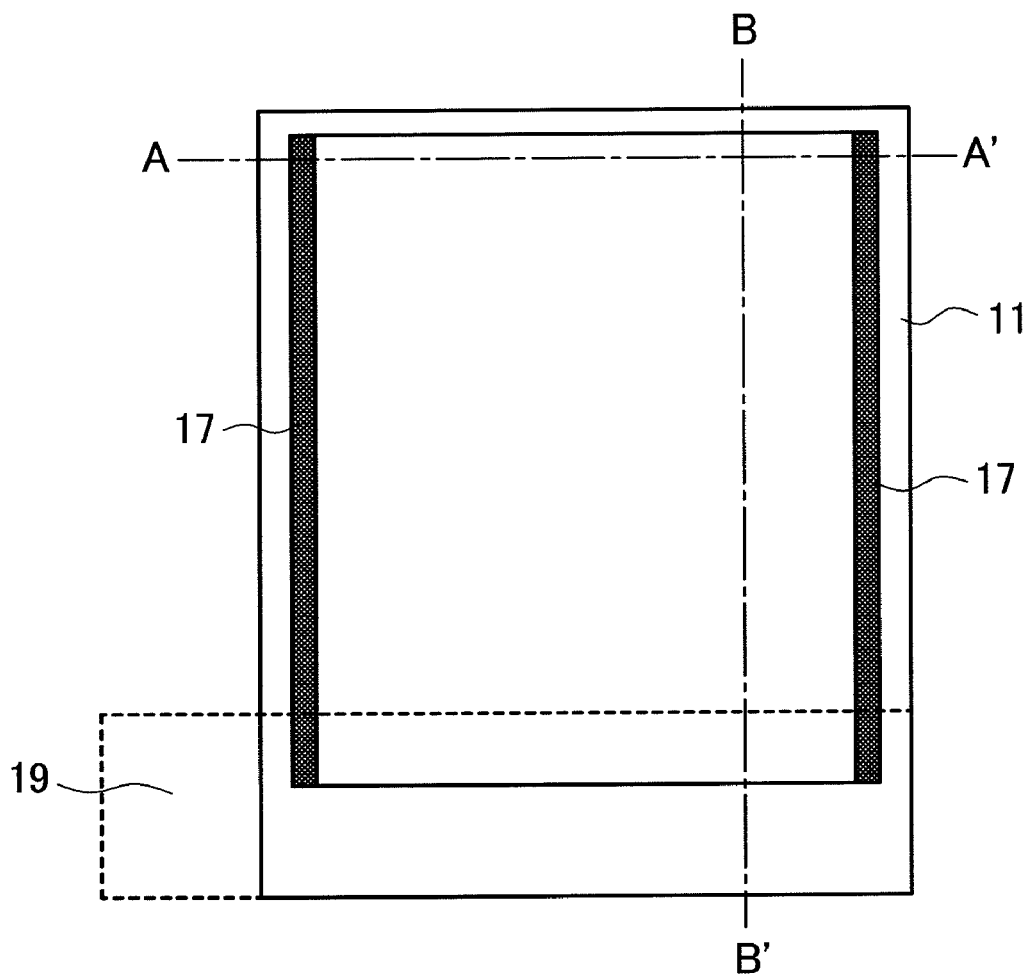

FIG. 2A is a view of the mold casing 11 shown in FIG. 1 as viewed from a side on which the light guide plate 15 is arranged. In FIG. 2A, the reflection sheet 16 is adhered to the mold casing 11 using the adhesive agent 17.

Figure 2B:
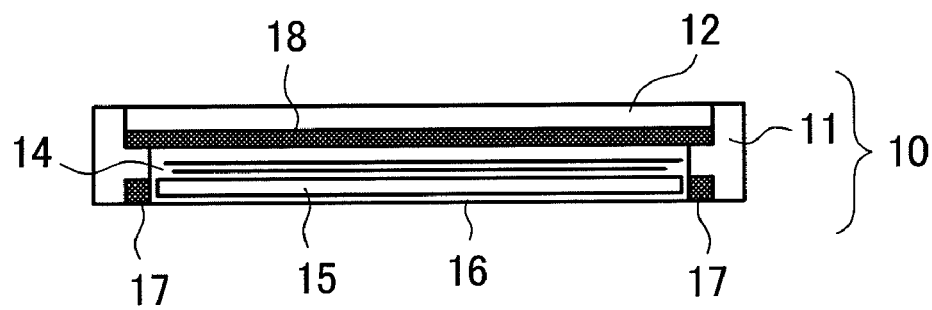

FIG. 2B shows the cross-sectional constitution of the liquid crystal display module 10 taken along a line A-A' in FIG. 2A.

As can be clearly understood from FIG. 2B, the liquid crystal panel 12 is housed in the upper side of the mold casing 11, the optical sheet 14 and the light guide plate 15 are housed in a lower side of the mold casing 11 and are adhered to the mold casing 11 using an adhesive agent 17 on the reflection sheet 16. Here, the liquid crystal panel 12 is also adhered to the mold casing 11 using an adhesive agent 18.

Figure 3:
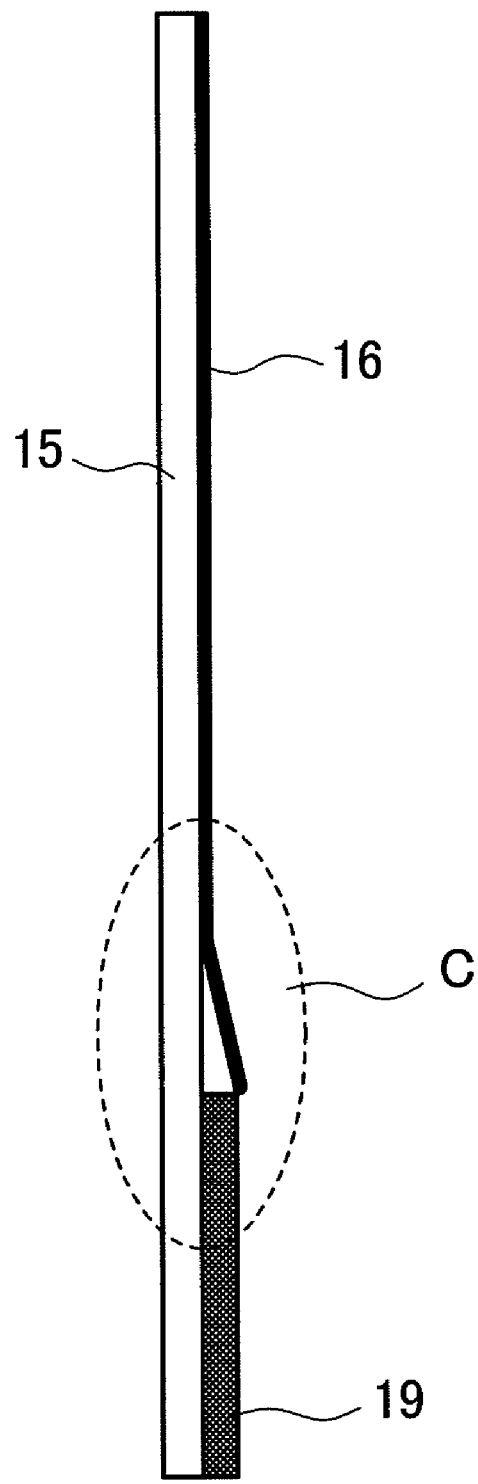
FIG. 3 is a view showing a state in which a reflection sheet is deflected by expansion due to the temperature elevation attributed to heat from a backlight device.

FIG. 3 is a view showing a state in which the reflection sheet is deflected by expansion due to the temperature elevation attributed to heat from a backlight device.

In FIG. 3, the reflection sheet 16 which is arranged on a back surface of the light guide plate 15 has a portion thereof pushed by a flexible printed circuit board 19. In such a state, being influenced by heat generated from the light source such as the LED, a boundary portion C which is a portion of the reflection sheet 16 pushed by the flexile printed circuit board 19 is deflected.

Figure 4:
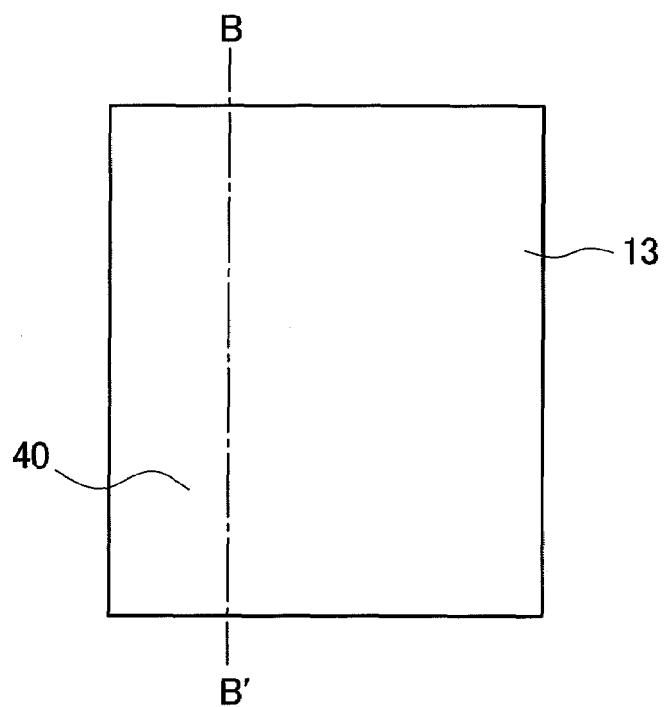
FIG. 4 is a view showing a display state of a display region 13 in a liquid crystal panel 12 in the state shown in FIG. 3.

FIG. 4 shows a display state of a display region 13 in the liquid crystal panel 12 in the state shown in FIG. 3. Here, B-B' indicates a portion of the display region 13 corresponding to B-B' in FIG. 2.

As shown in FIG. 4, being influenced by the deflection of the reflection sheet 16, a brightness line 40 is generated in the display region 13.

Figure 5:
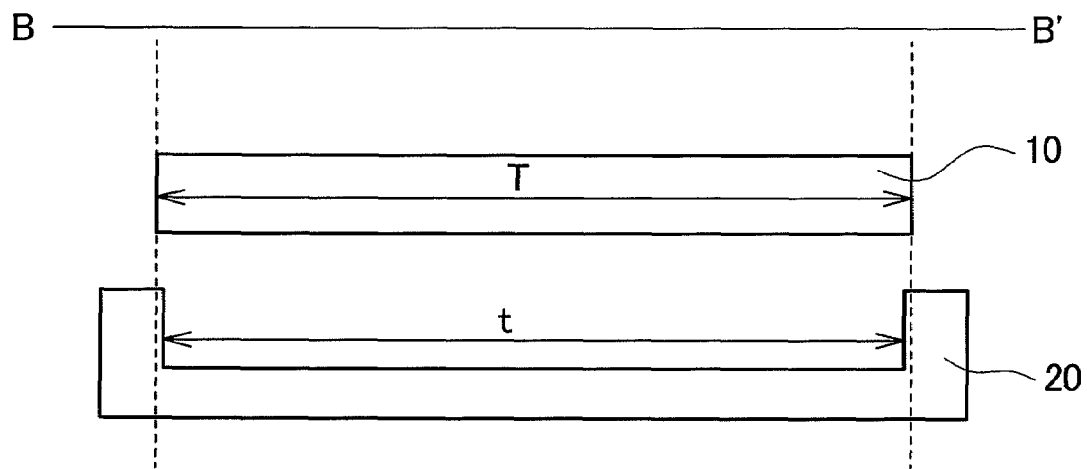
FIG. 5 is a view which explains a state in which a reflection sheet 16 is deflected due to shortage of clearance between the liquid crystal display module 10 and a housing of a mobile phone or the like thus generating display irregularities.

Next, in conjunction with FIG. 5, the explanation is made with respect to a state in which the reflection sheet 16 is deflected due to shortage of clearance between the liquid crystal display module 10 and a housing of a mobile phone or the like thus generating display irregularities.

In FIG. 5, numeral 10 indicates a liquid crystal display module explained in conjunction with FIG. 1 and FIG. 2, and numeral 20 indicates the housing 20 which houses the liquid crystal display module 10 in constituting the mobile phone or the like. Here, B-B' shows the positional relationship corresponding to B-B' in FIG. 2.

As shown in FIG. 5, in the present invention, the liquid crystal display module 10 with the display screen as large as possible is housed in the housing 20 having a housing space as small as possible by pushing. Therefore, with respect to the size relationship between the liquid crystal display module 10 and the housing 20, as shown in FIG. 5, the liquid crystal display module 10 is slightly larger than the housing 20.

Figure 6:
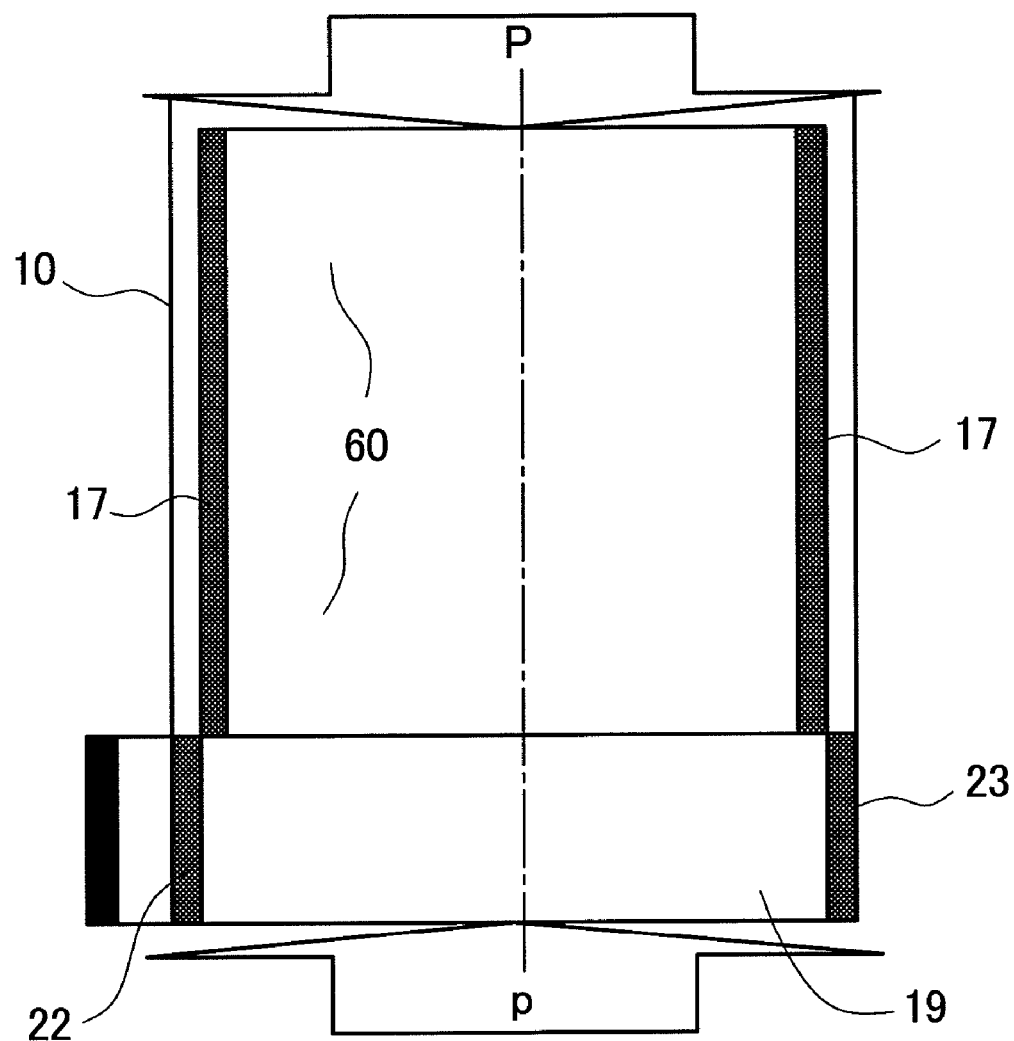
FIG. 6 is a view showing a deflection state of the reflection sheet 16 in a state shown in FIG. 5.
Figure 11:
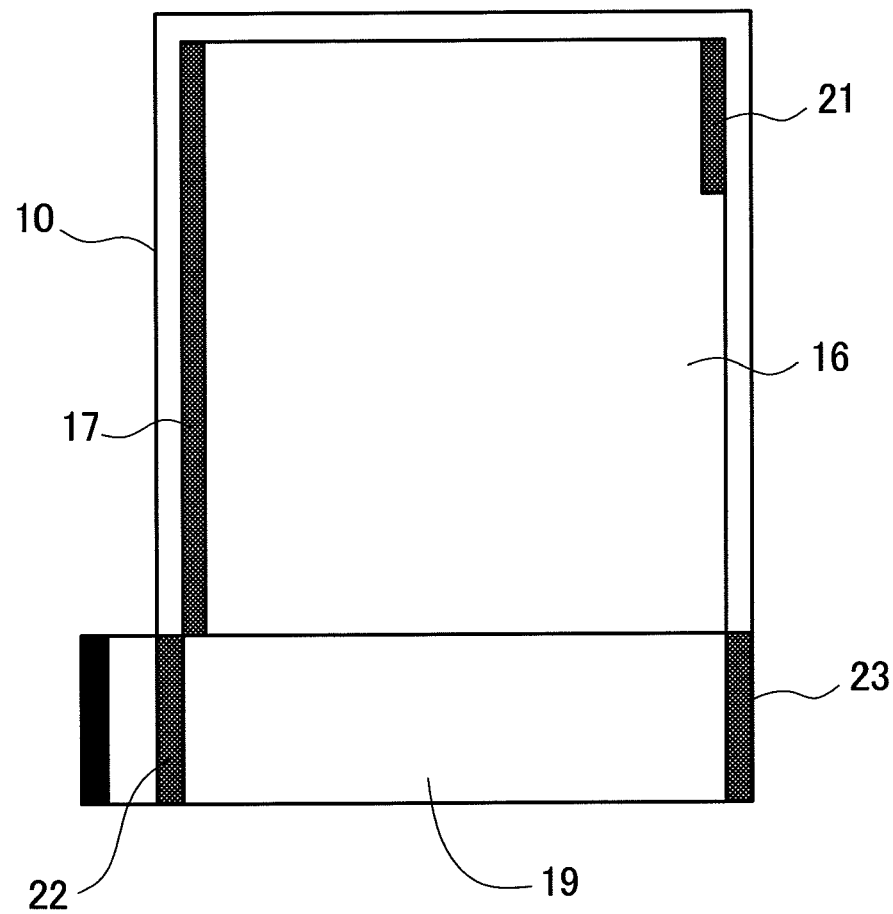
FIG. 11 is a view showing another embodiment of the present invention.

FIG. 6 is a view showing a deflection state of the reflection sheet 16 in a state shown in FIG. 5. As shown in FIG. 6, the liquid crystal display module 10 is housed in the housing 20 in a state that the liquid crystal display module 10 is pushed in and hence, force P shown in FIG. 6 from above the liquid crystal display module 10 and from below the liquid crystal display module 10 is applied. As a result, there arises a deflection 60 in the reflection sheet 16. Here, in FIG. 6, portions indicated by numerals 17 are forming portions of the adhesive agent arranged on the reflection sheet 16, and numeral 19 indicates a flexible print circuit board which pushes the reflection sheet 16 by one portion thereof. Further, numerals 22, 23 are portions of the flexible print circuit board 19 on which the adhesive agents are formed. In FIG. 6, although the adhesive agents 17, 22, 23 are depicted as observable, actually, the adhesive agent 17 is formed between the reflection sheet 16 and the mold casing 11, and the adhesive agents 22, 23 are formed between the reflection sheet 16 and the flexible printed circuit board 19. Accordingly, the adhesive agents 17, 22, 23 cannot be observed from the upper surface view. FIG. 11 described later also has similar constitution.

Figure 7:
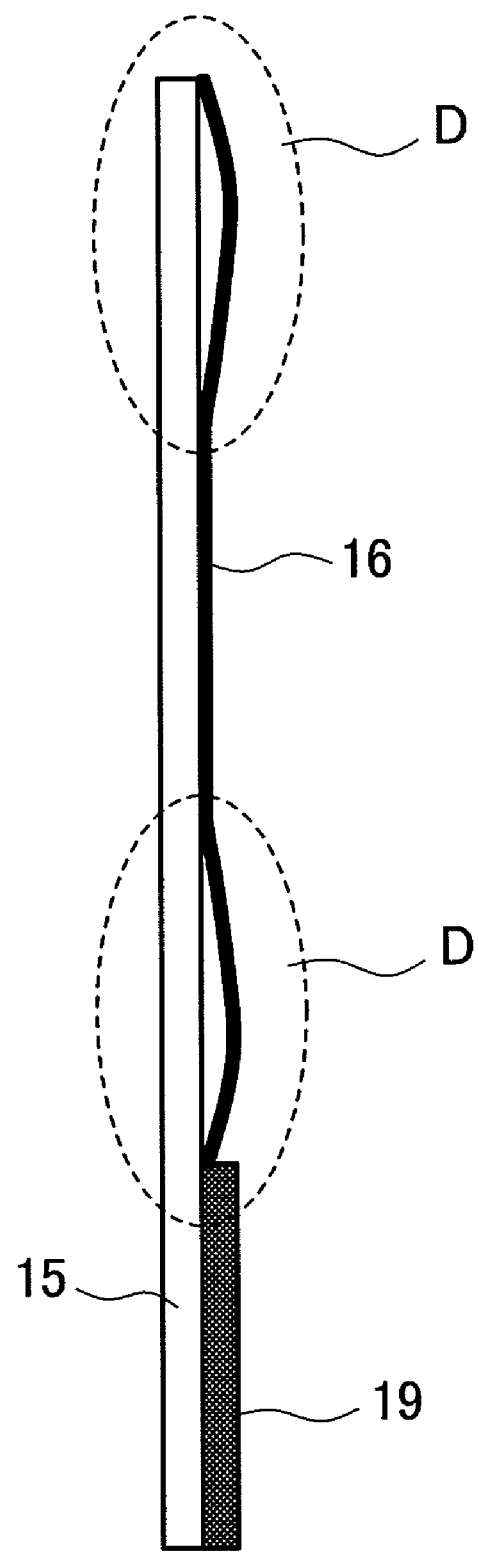
FIG. 7 is another view for explaining a state shown in FIG. 6.

FIG. 7 is another view for explaining a state shown in FIG. 6. As shown in FIG. 7, portions of the reflection sheet 16 indicated by D are deflected by a force P.

Figure 8:
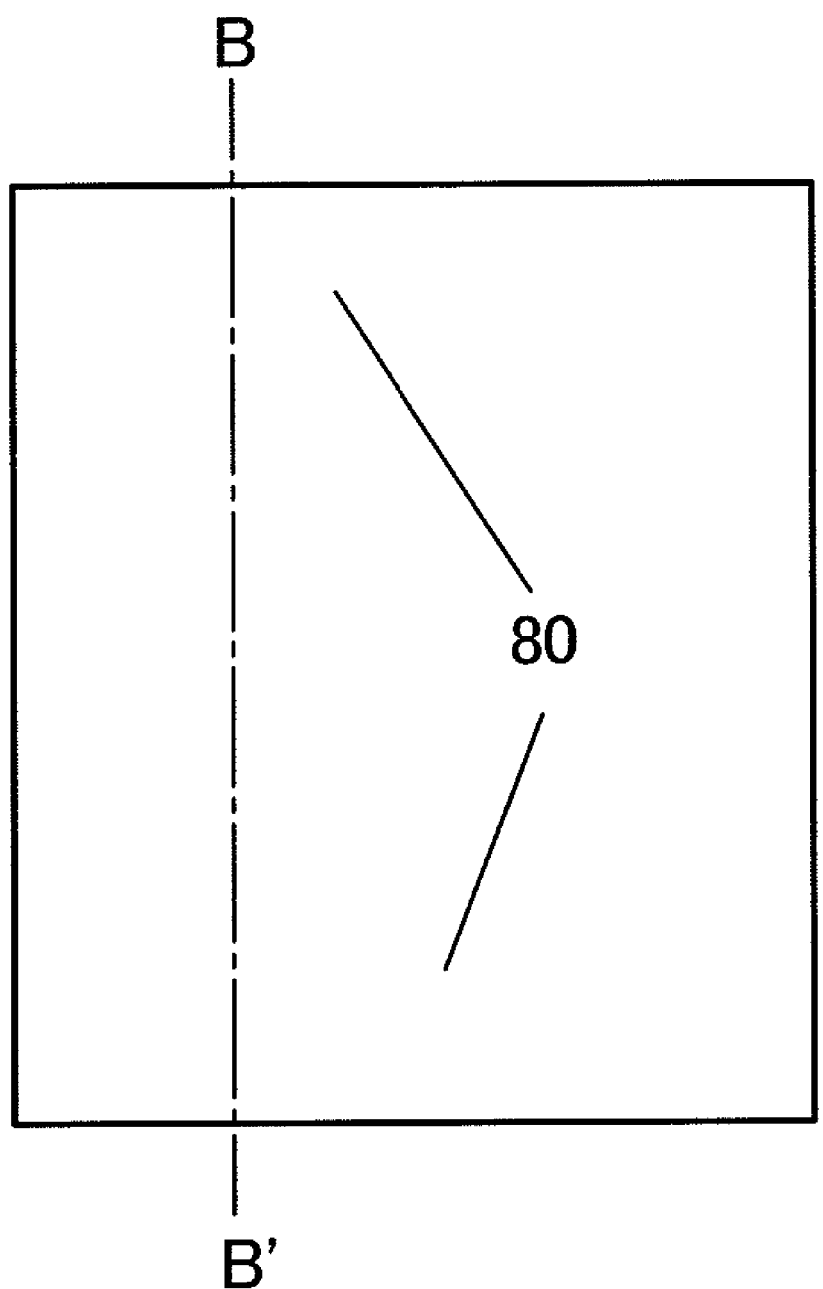
FIG. 8 is a view showing a display state of the display region 13 in the liquid crystal panel 12 in the state shown in FIG. 6 and FIG. 7.

FIG. 8 is a view showing a display state of the display region 13 in the liquid crystal panel 12 in the state shown in FIG. 6 and FIG. 7. Here, B-B' indicates a portion of the display region 13 corresponding to B-B' in FIG. 2.

FIG. 8 shows a state in which a brightness line 80 is generated in the display region 13 due to the influence attributed to the deflection of the reflection sheet 16.

Inventors of the present invention have considered that a cause which generates such a brightness line lies in that the reflection sheet 16 is fixed evenly on both sides of the reflection sheet 16 and hence, when the force P is applied to the reflection sheet 16, the force is directly applied to the reflection sheet 16.

Accordingly, the inventors of the present invention have, by taking the influence of heat attributed to the light source or the influence attributed to the force P which the reflection sheet 16 receives into consideration, arrived at the constitution of the liquid crystal display device which prevents the deflection of the reflection sheet 16 even when heat is applied to the reflection sheet 16 or the force P is applied to the reflection sheet 16.

Figure 9:
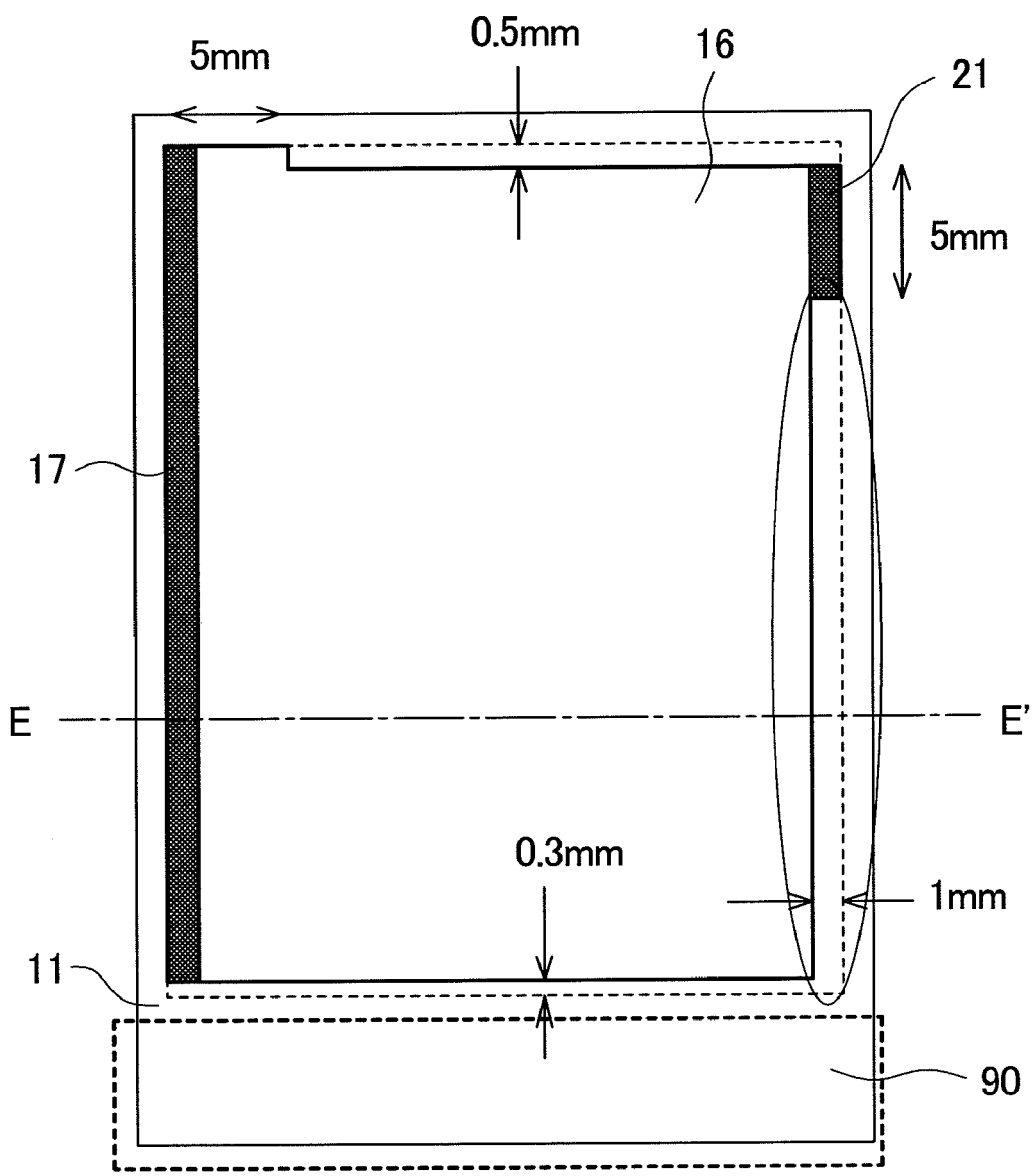
FIG. 9 is a view showing a mold case 11, the reflection sheet 16 and an adhesive agent forming portion 15 of the reflection sheet 16 according to the present invention.

FIG. 9 shows the frame-like mold case 11, the reflection sheet 16, and an adhesive agent forming portion 15 of the reflection sheet 16 according to the present invention.

One of technical features of the present invention lies in a shape of the reflection sheet 16 shown in FIG. 9. As shown in FIG. 9, the reflection sheet 16 of the present invention is not formed in a conventional rectangular shape but is configured such that a portion of the rectangular reflection sheet is cut out. According to the present invention, one of long sides is configured such that an adhesive agent 17 is formed on the whole side, while the opposing another long side is configured such that an adhesive agent 21 is formed only on a portion (5 mm) of the side. At a portion of another long side on which the adhesive agent 21 is not formed, the reflection sheet 16 is cut out. In FIG. 9, the cutout is configured to have a width of 1 mm. Further, with respect to the reflection sheet 16 of the present invention, also one side out of two short sides is also configured such that only a portion (5 mm) has the usual reflection sheet constitution and portions other than the portion 5 mm from an end portion are cut out. In FIG. 9, the cutout is configured to have a width of 0.5 mm. Here, as shown in a lower portion of FIG. 9, a gap having a width of 0.3 mm is formed between a lower side of the reflection sheet 16 in FIG. 9 and the mold casing 11.

To explain the portions of the reflection sheet 16 of the present invention on which the adhesive agents are arranged, the portion of one side of the reflection sheet on which the adhesive agent is arranged has a length larger than a length of the portion of another side of the reflection sheet on which the adhesive agent is arranged.

The present invention can, by providing the reflection sheet 16 having such a constitution, form the adhesive agent or form the cutout only on one portion of one side of the reflection sheet even when the reflection sheet 16 is influenced by heat attributed to the backlight or the force attributed to the housing thus releasing the expansion attributed to heat or releasing the force applied to the reflection sheet 16 whereby the generation of brightness irregularities can be prevented. Further, according to the present invention, instead of simply elongating the length of the portion of one side of the reflection sheet 16 on which the adhesive agent is arranged larger than the length of the portion of another side of the reflection sheet on which the adhesive agent is arranged, by setting the length of the former portion twice or more times larger than the length of the latter portion, it is possible to further enhance the above-mentioned advantageous effects. However, this does not mean that the larger the length of the portion of one side of the reflection sheet 16 on which the adhesive agent is arranged compared to the length of the portion of another side of the reflection sheet 16 on which the adhesive agent is arranged, the above-mentioned advantageous effect can be enhanced. The reason is that the shorter the length of another side on which the adhesive agent is arranged, the reflection sheet 16 is liable to be easily peeled off from this another side and hence, in case of the reflection sheet 16 which is used in a miniaturized liquid crystal display module having a display screen of 2 inches, for example, as shown in FIG. 9, it is necessary to set the length of the portion on which the adhesive agent is arranged to 5 mm or more (2 mm or more at minimum). The portion of the reflection sheet on which the adhesive agent is arranged may preferably extend by 5 mm or move (2 mm or more at minimum) from an end portion of the reflection sheet on a side opposite to the portion 90 on which the flexible printed circuit board is arranged. Here, with respect to the portion of one side of the reflection sheet 16 on which the adhesive agent is arranged, it is preferable that the adhesive agent is applied on whole another side (at least whole another side corresponding to the display region) for preventing the intrusion of dusts.

Here, the present invention adopts the constitution which arranges the light source such as the LED on one side surface of the light guide plate. In such a constitution, two sides of the reflection sheet 16 on which the adhesive agent is arranged are two sides at both sides of the surface on which the light source is arranged.

Figure 10:
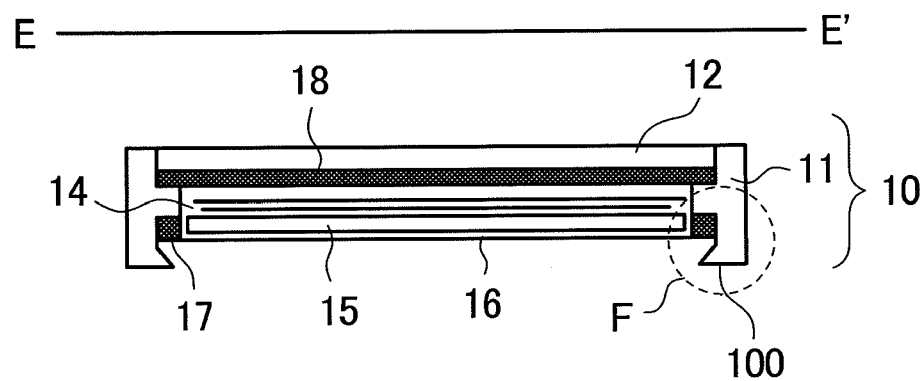
FIG. 10 is a view showing another technical feature of the present invention.

FIG. 10 is a view showing another technical feature of the present invention.

FIG. 10 is a cross-sectional view taken along a line E-E' in FIG. 9 and shows a cross-sectional shape of the liquid crystal display module 10.

In the constitution shown in FIG. 9, the adhesive agent 21 is formed on only the portion of one long side of the reflection sheet 16. In such a constitution, it is a matter of course that the portion on which the adhesive agent 21 is not formed may float from the reflection sheet 16 or dusts may intrude in the liquid crystal display module 10 from the portion on which the adhesive agent 21 is not formed. In view of the above, according to the present invention, a hook 100 is formed on a portion of the mold case 11 which corresponds to the portion of the reflection sheet 16 on which the adhesive agent is not formed thus preventing floating of the reflection sheet 16. Here, FIG. 9 shows a case in which the hook 100 is formed on both sides. However, there is no problem in forming the hook 100 on only one side on which the adhesive agent is not arranged.

FIG. 11 shows another embodiment of the present invention.

In the embodiment shown in FIG. 11, different from the reflection sheet 16 shown in FIG. 9, the reflection sheet 16 is formed in a rectangular shape without particularly forming cutouts. However, the adhesive agent 17 is formed on the complete one long side of the rectangular sheet, and the adhesive agent 21 is formed on a portion (for example, 5 mm in the same manner as FIG. 9) of opposing another long side. Also in such a constitution, due to the provision of the portion of one side of the reflection sheet 16 on which the adhesive agent is not formed, it is possible to release the expansion of the reflection sheet attributed to heat or a force applied to the reflection sheet and hence, it is possible to provide a liquid crystal display module with no display irregularities. Here, as constitutional features except for the cutouts are substantially equal to the corresponding constitutional features of the above-mentioned embodiment.

Figure 12:
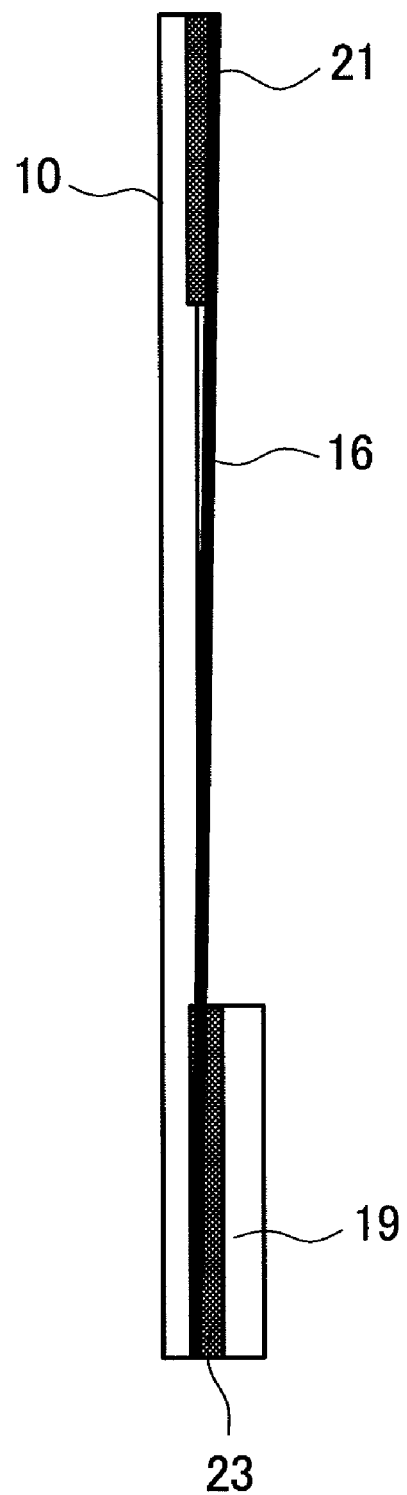
FIG. 12 is a view showing another technical feature 1 according to an embodiment shown in FIG. 11.

FIG. 12 shows another technical feature 1 according to the embodiment shown in FIG. 11. In the constitution shown in FIG. 11, there exists a possibility that dusts intrude into the liquid crystal display module 10 from the portion where the adhesive agent is not formed. However, as shown in FIG. 12, on the side of the reflection sheet on which the adhesive agent is not formed, an adhesive agent is formed on a portion of a flexible printed circuit board 19 which is arranged above the reflection sheet, and the reflection sheet 16 has one side thereof sandwiched by the liquid crystal display module 10 and the mold casing 11 and another side sandwiched by the liquid crystal display module 10 and the flexible printed circuit board 19 thus preventing the intrusion of the dusts.

Figure 13:
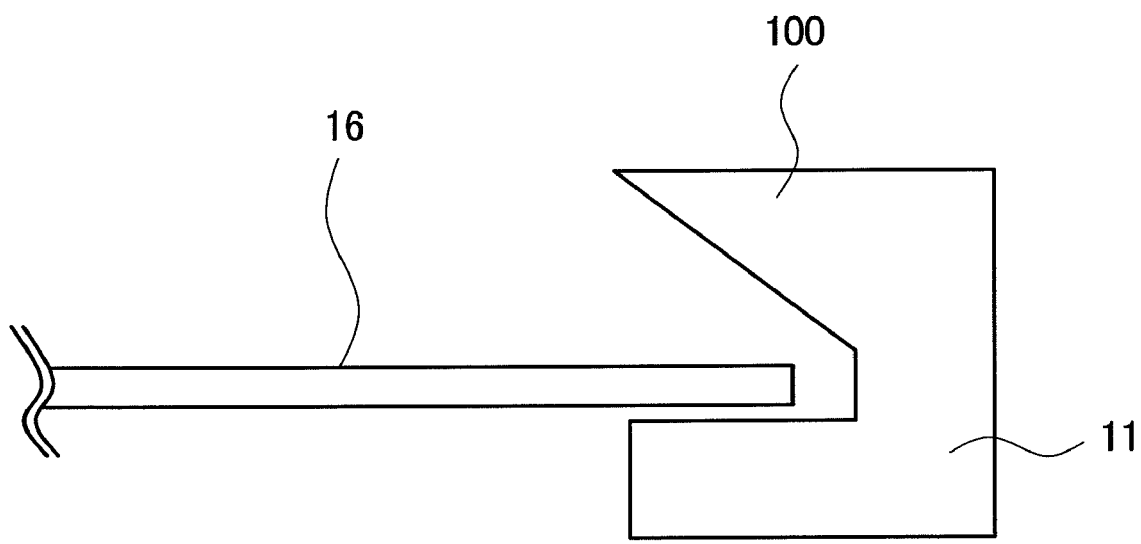
FIG. 13 is a view showing another technical feature 2 according to an embodiment shown in FIG. 11.

FIG. 13 shows another technical feature 2 of the embodiment shown in FIG. 11. In the constitution shown in FIG. 11, there exists a possibility that the dusts intrude the liquid crystal display module 10 from the portion on which the adhesive agent is not formed. However as shown in FIG. 13, which is a side view of the reflection sheet 16, due to the hook 100 which is additionally formed on the mold case 11 on a side of the reflection sheet which is the side on which the adhesive agent is not formed, floating of the reflection sheet 16 is prevented thus preventing the intrusion of the dusts.

The invention claimed is:

1. A liquid crystal display module comprising:
a liquid crystal display panel;
a frame-like mold frame;
a light guide plate; and
a reflection sheet, wherein
the liquid crystal display panel is arranged on an upper side of the mold frame, and the light guide plate and the reflection sheet are arranged on a lower side of the mold frame,
the reflection sheet is adhered to the mold frame using an adhesive agent which is formed on at least two sides of the reflection sheet which face each other in an opposed manner, and
a portion of one side of the reflection sheet on which the adhesive agent is arranged has a length larger than a length of a portion of another side of the reflection sheet on which the adhesive agent is arranged.

2. A liquid crystal display module according to claim 1, wherein the portion of one side of the reflection sheet on which the adhesive agent is arranged has a length two or more times as large as a length of the portion of another side of the reflection sheet on which the adhesive agent is arranged.

3. A liquid crystal display module according to claim 2, wherein the portion of another side of the reflection sheet on which the adhesive agent is arranged has a length of at least 2 mm or more.

4. A liquid crystal display module according to claim 3, wherein the portion of another side of the reflection sheet on which the adhesive agent is arranged has a length of at least 5 mm or more.

5. A liquid crystal display module according to claim 4, wherein the portion of another side of the reflection sheet on which the adhesive agent is arranged is formed from an end portion of the reflection sheet.

6. A liquid crystal display module according to claim 5, wherein the portion of one side of the reflection sheet on which the adhesive agent is arranged is arranged over the whole one side.

7. A liquid crystal display module according to claim 1, wherein a light source is arranged on one side surface of the light guide plate, and two sides are two sides which correspond to both sides of the side surface of the light guide plate on which the light source is arranged.

8. A liquid crystal display module according to claim 1, wherein the reflection sheet is configured such that a portion of the reflection sheet other than the portion of another side of the reflection sheet on which the adhesive agent is arranged in a short length is cut out.

9. A liquid crystal display device comprising:
a liquid crystal display module including a liquid crystal display panel, a frame-like mold frame, a light guide plate and a reflection sheet; and
a housing which houses the liquid crystal display module, wherein
the liquid crystal display module is configured such that
the liquid crystal display panel is arranged on an upper side of the mold frame, and the light guide plate and the reflection sheet are arranged on a lower side of the mold frame,
the reflection sheet is adhered to the mold frame using an adhesive agent which is formed on at least two sides of the reflection sheet which face each other in an opposed manner, and
a portion of one side of the reflection sheet on which the adhesive agent is arranged has a length larger than a length of a portion of another side of the reflection sheet on which the adhesive agent is arranged.

10. A liquid crystal display device according to claim 9, wherein the portion of one side of the reflection sheet on which the adhesive agent is arranged has a length two or more times as large as a length of the portion of another side of the reflection sheet on which the adhesive agent is arranged.

11. A liquid crystal display device according to claim 9, wherein the reflection sheet is configured such that a portion of the reflection sheet other than the portion of another side of the reflection sheet on which the adhesive agent is arranged is cut out.

12. A liquid crystal display module comprising:
a liquid crystal display panel;
a frame-like mold frame;
a light guide plate; and
a reflection sheet, wherein
the liquid crystal display panel is arranged on an upper side of the mold frame, and the light guide plate and the reflection sheet are arranged on a lower side of the mold frame,
the reflection sheet is adhered to the mold frame using an adhesive agent which is formed on at least two sides of the reflection sheet which face each other in an opposed manner,
a portion of one side of the reflection sheet on which the adhesive agent is arranged has a length larger than a length of a portion of another side of the reflection sheet on which the adhesive agent is arranged, and
a hook which prevents floating of the reflection sheet is formed on a portion of the mold frame at a portion of the reflection sheet other than the portion of another side of the reflection sheet on which the adhesive agent is arranged.

13. A liquid crystal display module according to claim 12, wherein the portion of one side of the reflection sheet on which the adhesive agent is arranged has a length two or more times as large as a length of the portion of another side of the reflection sheet on which the adhesive agent is arranged.

14. A liquid crystal display device comprising:
a liquid crystal display module including a liquid crystal display panel, a frame-like mold frame, a light guide plate and a reflection sheet; and
a housing which houses the liquid crystal display module, wherein
the liquid crystal display module is configured such that
the liquid crystal display panel is arranged on an upper side of the mold frame, and the light guide plate and the reflection sheet are arranged on a lower side of the mold frame,
the reflection sheet is adhered to the mold frame using an adhesive agent which is formed on at least two sides of the reflection sheet which face each other in an opposed manner,
a portion of one side of the reflection sheet on which the adhesive agent is arranged has a length larger than a length of a portion of another side of the reflection sheet on which the adhesive agent is arranged, and
a hook which prevents floating of the reflection sheet is formed on a portion of the mold frame at a portion of the reflection sheet other than the portion of another side of the reflection sheet on which the adhesive agent is arranged.

15. A liquid crystal display device according to claim 14, wherein the portion of one side of the reflection sheet on which the adhesive agent is arranged has a length two or more times as large as a length of the portion of another side of the reflection sheet on which the adhesive agent is arranged.

* * * * *